(12) United States Patent
Sata et al.

(10) Patent No.: US 10,180,669 B2
(45) Date of Patent: *Jan. 15, 2019

(54) CONTROL DEVICE DESIGN METHOD AND CONTROL DEVICE

(71) Applicants: Kota Sata, Susono (JP); Junichi Kako, Susono (JP); Satoru Watanabe, Susono (JP); Yuta Suzuki, Nagoya (JP); Masato Edahiro, Nagoya (JP)

(72) Inventors: Kota Sata, Susono (JP); Junichi Kako, Susono (JP); Satoru Watanabe, Susono (JP); Yuta Suzuki, Nagoya (JP); Masato Edahiro, Nagoya (JP)

(73) Assignees: NATIONAL UNIVERSITY CORPORATION NAGOYA UNIVERSITY, Nagoya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 497 days.

This patent is subject to a terminal disclaimer.

(21) Appl. No.: 14/768,606

(22) PCT Filed: Feb. 12, 2014

(86) PCT No.: PCT/JP2014/053177
§ 371 (c)(1),
(2) Date: Aug. 18, 2015

(87) PCT Pub. No.: WO2014/129354
PCT Pub. Date: Aug. 28, 2014

(65) Prior Publication Data
US 2015/0378335 A1    Dec. 31, 2015

(30) Foreign Application Priority Data

Feb. 21, 2013    (JP) .................................. 2013-032321

(51) Int. Cl.
G05B 17/02    (2006.01)

(52) U.S. Cl.
CPC ..................................... *G05B 17/02* (2013.01)

(58) Field of Classification Search
CPC ........ G05B 17/02; G05B 11/42; G05B 11/36; G05B 2219/23217
See application file for complete search history.

(56) References Cited

U.S. PATENT DOCUMENTS 4,993,386 A * 2/1991 Ozasa ...................... F01M 3/02
123/1 A
5,568,378 A * 10/1996 Wojsznis ............. G05B 13/048
700/44

(Continued)

FOREIGN PATENT DOCUMENTS

JP    2010-160537 A    7/2010

OTHER PUBLICATIONS

US Patent and Trademark Office, Office Action in U.S. Appl. No. 14/768,635, dated Nov. 3, 2017, 30 pages.

(Continued)

*Primary Examiner* — Kenneth M Lo
*Assistant Examiner* — Chad G Erdman
(74) *Attorney, Agent, or Firm* — Hunton Andrews Kurth LLP

(57) ABSTRACT

The present invention relates to a control device design method for a control device that determines a manipulation amount of a control object having a dead time by feedback control so as to bring a control amount of the control object closer to a target value. The method according to the present invention includes a step of designing a feedback loop that computes a correction amount for the manipulation amount using a plurality of controllers including a prediction model of the control object, a step of deriving the same number of (Continued)

delay elements as the plurality of controllers from a dead time element of the prediction model, and a step of allocating the plurality of controllers associated with the delay elements to a plurality of arithmetic units so that the computation of the feedback loop is performed by parallel computation by the plurality of arithmetic units that operate in parallel.

9 Claims, 3 Drawing Sheets

(56) References Cited

U.S. PATENT DOCUMENTS

| | | | |
|---|---|---|---|
| 5,748,467 A * | 5/1998 | Qin | G05B 13/0275 700/41 |
| 5,838,599 A * | 11/1998 | Tao | G05B 13/042 708/304 |
| 5,983,875 A | 11/1999 | Kitagawa et al. | |
| 6,185,468 B1 * | 2/2001 | Wells | D21G 9/0027 162/253 |
| 8,698,469 B1 | 4/2014 | Latham, II et al. | |
| 2003/0033075 A1 * | 2/2003 | Yasui | F02D 41/1402 701/109 |
| 2003/0106544 A1 * | 6/2003 | Davis, Jr. | F02D 41/0042 123/679 |
| 2003/0116123 A1 | 6/2003 | Ito et al. | |
| 2007/0038987 A1 | 2/2007 | Ohara et al. | |
| 2007/0131208 A1 * | 6/2007 | Okazaki | F02D 41/1439 123/694 |
| 2009/0138172 A1 | 5/2009 | Okazaki et al. | |
| 2010/0057324 A1 * | 3/2010 | Glugla | F02D 35/021 701/102 |
| 2010/0169892 A1 | 7/2010 | Stam et al. | |
| 2011/0001529 A1 * | 1/2011 | Gendai | H03G 3/301 327/161 |
| 2011/0197047 A1 | 8/2011 | Hiroshi | |
| 2012/0095658 A1 * | 4/2012 | Yasui | F02D 41/1403 701/60 |
| 2012/0170639 A1 | 7/2012 | Salsbury | |
| 2013/0037121 A1 | 2/2013 | Kiesbauer et al. | |
| 2013/0232346 A1 * | 9/2013 | Wu | G06F 1/3228 713/300 |
| 2013/0338934 A1 | 12/2013 | Asadi et al. | |
| 2014/0229089 A1 | 8/2014 | Jankovic et al. | |
| 2014/0344825 A1 | 11/2014 | Suzuki | |

OTHER PUBLICATIONS

Wills et al., "Fast Linear Model Predictive Control Via Custom Integrated Circuit Architecture," IEEE Transactions on Control Systems Technology, IEEE Service Center, New York, NY, vol. 20, No. 1 (Jan. 1, 2012), pp. 59-71. (cited in EESR in related appln corresponding to U.S. Appl. No. 14/768,635).

Craciun et al., "A Parallel Hardware Architecture for Information-theoretic Adaptive Filtering," High-Performance Reconfigurable Computing Technology and Applications (HPRCTA), 2010 Fourth International Workshop on, IEEE, Piscataway, New Jersey, US (Nov. 14, 2010), pp. 1-10. (cited in EESR in related appln corresponding to U.S. Appl. No. 14/768,635).

Final Office Action dated Jun. 5, 2018; issued by the U.S. Patent and Trademark Office in U.S. Appl. No. 14/768,635, 21 pages.

Advisory Action dated Oct. 11, 2018 issued by the U.S. Patent and Trademark Office in U.S. Appl. No. 14/768,635, 3 pages.

* cited by examiner

CONTROL DEVICE DESIGN METHOD AND CONTROL DEVICE

CROSS-REFERENCE TO RELATED APPLICATIONS

This is a national phase application based on the PCT International Patent Application No PCT/JP2014/053177 filed Feb. 12, 2014, claiming priority to Japanese Patent Application No. 2013-032321 filed Feb. 21, 2013, the entire contents of both of which are incorporated herein by reference.

TECHNICAL FIELD

The present invention relates to a control device design method, or in particular, to a control device design method for a control device that handles a physical phenomenon. In particular, it relates to a control device design method for a control device that determines a manipulation amount of a control object that has a dead time by feedback control, and to the control device.

BACKGROUND ART

Computational power of a computing device can be improved by increasing the operational frequency of the core. Depending on the environment of the computing device, however, the operational frequency may be unable to be increased. And from the viewpoint of power efficiency, there is a limit to improving the performance by increasing the operational frequency. In recent years, as disclosed in Japanese Patent Laid-Open No. 2010-160537, multi-core parallel computing devices with a plurality of cores mounted on a single semiconductor chip have been attracting attention. The multi-core parallel computing devices require lower operational frequency than single-core computing devices, provided that the amount of computation is the same. In addition, since tasks to be processed are allocated to the plurality of cores for parallel computation, the operating time can be reduced compared with the case where a single core performs the computation.

Advantageous applications of such a parallel computing device include a real-time control device. To control the operation or state of a complicated control object, the real-time control device uses a control algorithm that involves many numerical calculations. In particular, with a vehicle control device, which is a kind of the real-time control device, the control algorithm has becoming larger in scale and becoming more complicated year by year in order to meet the market and regulatory requirements. Thus, the operational load is increasing, and a single-core central processing unit (CPU) will probably become unable to complete the computation in the control period. Application of the parallel computing device to the real-time control device is expected as effective means for avoiding such a situation.

CITATION LIST

Patent Literature

Patent Literature 1
  Japanese Patent Laid-Open No. 2010-160537

SUMMARY OF INVENTION

Technical Problem

However, simply applying the parallel computing device to the control device is not sufficient to satisfactorily improve the performance of the control device. Conventionally, the control algorithm is parallelized in the software design phase. However, if the control algorithm is highly sequential, there is a limit to parallelization in the software design phase, that is, parallelization at the source code level. According to Amdahl's law, supposing that a program, the rate of the execution time of the part of which that can be parallelized is a, is executed using N cores, the rate S of performance improvement as a whole is expressed as $S=1/((1-a)+a/N)$. As can be seen from this formula, with a program only a small part of which can be parallelized, the performance is difficult to improve in one step. In addition, since an actuator output occurs in response to a sensor input in each step, it is also difficult to take advantage of the parallelism of multiple cores to perform stream processing of the input data. In addition, since the parallelization involves an overhead, there is also a limit to parallelization based on division of the task into fine-grain tasks with a reduced amount of computation on a plan or module basis or to parallelization based on division of the loop. This is because, as the number of divisions increases, the cost of computation synchronization between the cores, communication of the computation results and the like increases, so that the expected performance becomes unable to be achieved by the parallel computation.

The difficulty of the parallelization at the source code level of a control algorithm that is highly sequential can be specifically described with reference to a real-time control device and, in particular, a control logic of a control device that handles a physical phenomenon. Control objects of such a control device have more or less a dead time, so that a control theory applicable to a time delay system can be used as the control algorithm. A representative time delay system control is an internal model control (IMC) that uses a prediction model, which is a model of a control object, to perform feedback control. In the following, a control logic of the internal model control used for a conventional control device and problems with parallelization of the control logic will be described.

FIG. 3 is a block diagram showing a control logic of a typical internal model control used for a conventional control device. A control object 2 has a dead time L, and a transfer function thereof can be expressed by $Pe^{-Ls}$. In the internal model control, a feedback system including a prediction model 102, which is a model of the control object 2, and an IMC filter 101 is built. The prediction model 102 is a model of the control object 2 including the dead time L, so that a transfer function thereof can be expressed as $Me^{-Ls}$. Although the transfer function $Me^{-Ls}$ of the prediction model 102 and the true transfer function $Pe^{-Ls}$ of the control object 2 ideally perfectly agree with each other, there is actually a modeling error between the transfer functions. A transfer function Cimc of the IMC filter 101 is defined as an inverse of a minimum phase element of the transfer function of the prediction model 102. The IMC filter 101 calculates a manipulation amount u for an actuator of the control object 2 based on a target value r of a control amount. The manipulation amount u and a disturbance d are input to the control object 2, and a sensor value y of the control amount affected by the disturbance d is obtained from the control object 2. The "sensor value" means a measurement value of the control amount measured by a sensor. The prediction model 102 is arranged in parallel with the control object 2, and the manipulation amount u is also input to the prediction model 102. A difference between the sensor value y and an output of the prediction model 102 is fed back to the target value r through a disturbance compensator 103, which is shown as a transfer function Cdis.

In the control logic shown in FIG. 3, operations of the three controllers, the prediction model 102, the IMC filter 101 and the disturbance compensator 103, are sequential. The operational sequentiality can be shown by arranging the processings of the controllers on the time axis. FIG. 4 is a diagram showing a temporal relationship between the operations of the controllers in a case where the control logic described above is implemented in a conventional single-core computing device. In FIG. 4, the horizontal axis is the time axis, and the processings in one step are arranged on the time axis. As shown in this drawing, operation according to the prediction model ($Me^{-Ls}$) 102, subtraction of the sensor value y, operation by the disturbance compensator (Cdis) 103, subtraction of the target value r, and operation by the IMC filter (Cimc) 101 are sequentially performed to calculate a manipulation amount u' for the next step.

The control logic described above can be implemented in a multi-core computing device. When the control logic described above is implemented in a multi-core computing device, the processings in one step need to be divided into a plurality of tasks, and the tasks need to be allocated to the cores. In this example, discretization is performed on the basis of the three controllers, and then, the resulting tasks are allocated to the three cores. The addition and subtraction of the sensor value y and the addition and subtraction of the target value r are included in the preceding or following task. FIG. 5 is a diagram showing a temporal relationship between the processings in a case where the processings are allocated to a plurality of cores in this way. Each core has only to process a part of the tasks, so that the operating time of each core is reduced compared with the case where a single core performs all the processings. However, even if a plurality of cores is used for processing, the operational sequentiality is maintained, so that any task for any controller cannot be started before the task for the preceding controller is completed. That is, the plurality of cores is not allowed to perform the respective tasks at the same time, so that the processing of one step cannot be sped up as a whole of the computing device. As can be seen from the above description, even if the control logic described above is implemented in a multi-core computing device, parallelization is allowed only at the source code level, so that the operating time cannot be substantially reduced by such parallelization.

Another possibility is parallelization at the control logic level rather than the source code level. An update formula for the manipulation amount in the internal model control is considered. The following formula (1) is an update formula for the manipulation amount for the control logic shown in FIG. 3. The variables and transfer functions in the update formula correspond to the variables and transfer functions of the controllers in the control logic shown in FIG. 3.

[Formula 1]

$$u = \{r - (y - u*M(s)e^{-Ls})*Cdis(s)\}*Cimc(s) \quad (1)$$

As can be seen from the update formula, the operational sequentiality involved with inputs and outputs between the tasks shown in FIG. 5 is caused by the parenthesization of the additions and subtractions in the update formula. That is, although additions and subtractions performed on a plurality of elements are implicitly synchronized between the cores, a sequential order occurs between the tasks once the additions and subtractions are parenthesized. Thus, to eliminate the sequentiality caused by the parenthesization, the formula is expanded into terms relating to the variables r, y and u. Such a transformation of the formula (1) results in another update formula expressed by the following formula (2).

[Formula 2]

$$u = r*Cimc(s) - y*Cdis(s)*Cimc(s) + u*M(s)e^{-Ls}*Cdis(s)*Cimc(s) \quad (2)$$

FIG. 6 is a block diagram showing a control logic that corresponds to the formula (2). As can be seen from the relationship between the formulas (1) and (2), the control logic shown in FIG. 6 is an equivalent transformation of the control logic shown in FIG. 3. In the equivalent transformation, one disturbance compensator (Cdis) and two IMC filters (Cimc) are duplicated. According to the control logic shown in FIG. 6, the manipulation amount u is fed back to the manipulation amount u itself through the prediction model ($Me^{-Ls}$) 112, the disturbance compensator (Cdis) 113 and the IMC filter (Cimc) 114, and at the same time, the sensor value y is fed back to the manipulation amount u through the disturbance compensator (Cdis) 115 and the IMC filter (Cimc) 116.

Operations of the terms relating to the variables r, y and u that are not parenthesized in the formula (2) are divided as separate tasks, and the tasks are allocated to the three cores. In addition, the additions and subtractions for calculating the manipulation amount u' for the next step from the outputs of the tasks are allocated to any of the cores. FIG. 7 is a diagram showing a temporal relationship between the processings in a case where the processings are allocated to the plurality of cores in this way. In FIG. 7, the horizontal axis is the time axis, and the processings in one step are arranged on the time axis. In this drawing, a task 1 is allocated to a core 1, tasks 2 and 3 are allocated to a core 2, and tasks 4, 5 and 6 are allocated to a core 3. Since what is input to each core for the task(s) is a different one of the variables r, y and u, so that any core can start processing the task(s) without waiting for another core to complete its task(s). That is, when the control logic shown in FIG. 6 is implemented in a multi-core computing device, the cores can start operation in parallel.

However, in actual, the operating time per step in the flow shown in FIG. 7 is not shorter than the operating time per step in the flow shown in FIG. 4 or 5. This is because the task relating to the term of the manipulation amount u includes operations relating to all the controllers. Specifically, the task includes the operation according to the prediction model ($Me^{-Ls}$) (task 4), the operation by the disturbance compensator (Cdis) (task 5) and the operation by the IMC filter (Cimc) (task 6). Thus, the process is no more efficient than the process of the conventional single core computing device. On the contrary, the operating time per step may increase since the results of the operations of the tasks by the cores are gathered at one core to perform additions and subtractions and therefore the cost increases.

As described above, even if the parallel computing device is applied to the control device, if the parallelization is a parallelization at the source code level or a simple parallelization at the control logic level, the operating time cannot be sufficiently reduced by the parallel computation. To reduce the operating time by parallelization of the operations involved with the feedback control, the design of the control logic needs to be further improved.

The present invention has been devised in view of such problems, and an object of the present invention is to provide a control device design method for a control device capable of parallelizing operations involved with a feedback control to reduce the operating time by improving the design of a control logic. Another object is to provide a control device designed by the method described above that can perform operations involved with a feedback control in a shorter time.

Solution to Problem

A control device design method according to the present invention is a control device design method for a control device that is associated with a control object having a dead time and determines a manipulation amount of the control object by feedback control so as to bring a control amount of the control object closer to a target value. The feedback control according to the present invention may be internal model control as well as an equivalent transformation thereof, such as control by Smith method. According to the control device design method according to the present invention, a feedback loop that computes a correction amount for the manipulation amount is designed using a plurality of controllers including a prediction model of the control object. The same number of delay elements as the plurality of controllers forming the feedback loop are then derived from a dead time element of the prediction model of the control object. The plurality of controllers associated with the delay elements are then allocated to a plurality of arithmetic units that operate in parallel so that the computation of the feedback loop is performed by parallel computation by the plurality of arithmetic units.

A control device according to the present invention is a control device designed according to the designing method described above. The control device according to the present invention includes a plurality of arithmetic units that operate in parallel. Preferably, the control device according to the present invention is implemented in a multi-core processor that has a plurality of cores, and a different core is used as each of the plurality of arithmetic units. Alternatively, each of the plurality of arithmetic units may be configured as a single core or a multi-core processor.

The arithmetic units are configured so that a signal is sequentially transmitted by the arithmetic units. Furthermore, the arithmetic units are configured so that a manipulation amount of the control object is input to the first arithmetic unit in a signal transmission sequence, and a correction amount for the manipulation amount is output from the last arithmetic unit in the signal transmission sequence. That is, the arithmetic units form a closed loop that feeds the manipulation amount back to the manipulation amount for the next step. Since the control object has a dead time, the closed loop also includes a delay that is equal to the dead time of the control object.

Each of arithmetic units have a delay element that delays an input by a predetermined number of steps and a controller that produces an output by processing the input delayed by the delay element. The number of steps by which each delay element delays the input is preferably one. The total delay time of the signal transmitted by the arithmetic units is determined by the total number of delay elements and the control period of the control device. The arithmetic units of the control device according to the present invention are configured so that a sum of a total delay time of the delay elements and a total dead time of the controllers is equal to the dead time of the control object. The dead time of the control object is substantially the same as the dead time of the prediction model of the control object. All the controllers do not necessarily have a dead time. It is necessary only that any one of the controllers has a dead time.

Preferably, the arithmetic units are configured so that the amount of operation of the controller is uniform between the arithmetic units. The controller may include an element such as a prediction model of the control object that ignores the dead time, a dead time element that uses as a dead time the difference between the dead time of the control object and the total delay time, an IMC filter and a disturbance compensator. An appropriate combination of these elements forms the controller. Preferably, a controller including the prediction model that ignores the dead time, a controller including the dead time element, a controller including the IMC filter and a controller including the disturbance compensator are separately provided.

Advantageous Effects of Invention

According to the control device design method according to the present invention, the plurality of controllers forming the feedback loop are distributed among the plurality of arithmetic units that operate in parallel, and the same number of delay elements as the controllers are derived from the dead time element of the prediction model of the control object and distributed among the arithmetic units. There is a sequentiality between the controllers forming the feedback loop. According to the present invention, however, the controllers associated with the delay elements are implemented in the arithmetic units, so that each arithmetic unit can perform operation using the manipulation amount before the delay time or the output of another arithmetic unit before the delay time and does not need to wait for another arithmetic unit to complete its operation for sequential operation. That is, the control device design method according to the present invention allows parallelization of operations involved with the feedback control to reduce the operating time.

With the control device according to the present invention configured according to the designing method described above, the operating time of the whole of the control device is reduced by parallelization of operations involved with the feedback control.

DESCRIPTION OF EMBODIMENT

In the following, an embodiment of the present invention will be described.

First, attention is focused on the term of the manipulation amount u in the formula (2) described above. The term of the manipulation amount u includes the transfer function $Me^{-Ls}$ of the prediction model, and the transfer function $Me^{-Ls}$ of the prediction model includes the dead time L. Supposing that the dead time L is longer than three control periods T. According to a designing method according to the present invention, the same number of delay elements $e^{-Ts}$ as controllers forming a feedback loop are derived from a dead time element $e^{-Ls}$ of the prediction model. The term of the manipulation amount u includes three elements (controllers) including the transfer function $Me^{-Ls}$, so that, according to the designing method according to the present invention, three $e^{-Ts}$ are derived from $e^{-Ls}$ in the formula (2) and distributed among the elements. Therefore, an update formula of the manipulation amount u expressed by the following formula (3) is obtained. Note that it is assumed that all the transfer functions involved with the internal model control are linear transfer functions in this embodiment.

[Formula 3]

$$u = r*Cimc(s) - y*Cdis(s)*Cimc(s) + u*e^{-Ts}M(s)$$
$$e^{-(L-3T)s}*e^{-Ts}Cdis(s)*e^{-Ts}Cimc(s) \quad (3)$$

Figure 1:
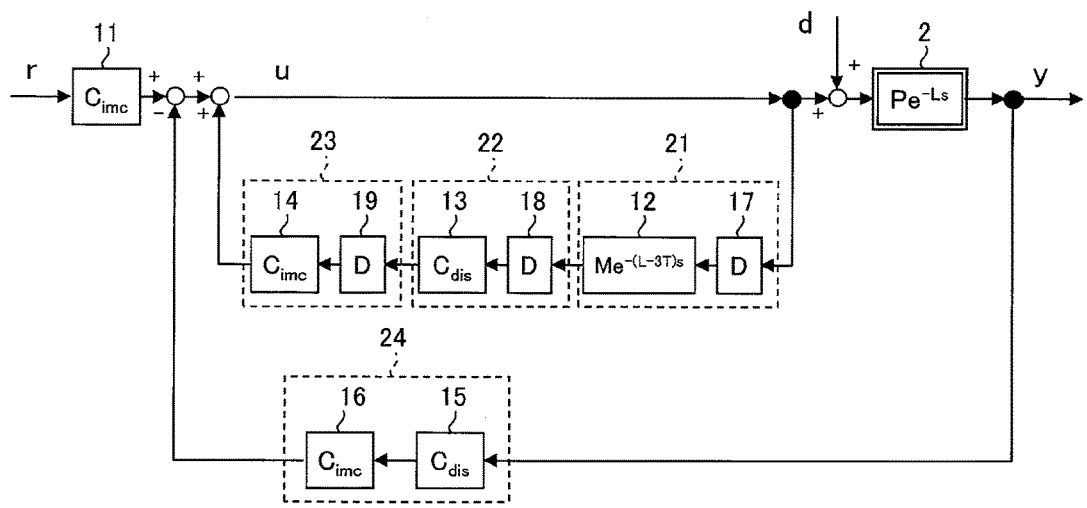
FIG. 1 is a block diagram showing a control logic of an internal model control of a control device according to an embodiment of the present invention.
Figure 6:
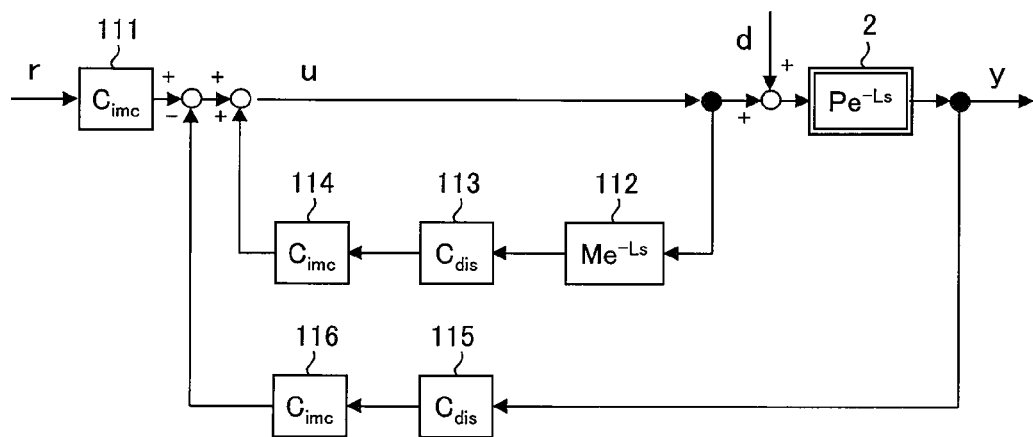
FIG. 6 is a block diagram showing a control logic of an internal model control obtained by equivalent transformation of the control logic shown in FIG. 3.
Figure 7:
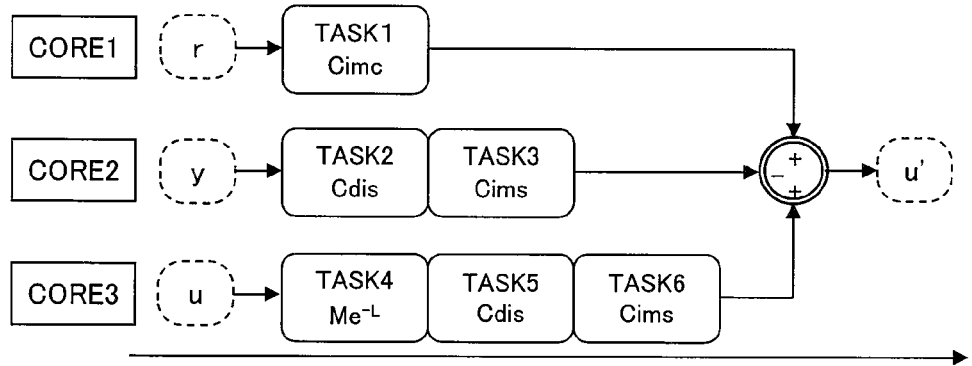
FIG. 7 is a diagram showing a temporal relationship between operations of controllers in a case where the control logic shown in FIG. 6 is implemented in a multi-core computing device.

FIG. 1 is a block diagram showing the control logic of the internal model control of the control device according to this embodiment. The control logic shown in FIG. 1 corresponds to the formula (3) described above. As can be seen from the relationship between the formulas (2) and (3), the control logic shown in FIG. 1 is an equivalent transformation of the control logic shown in FIG. 6.

With the control device, a target value r of a control amount is input to an IMC filter (Cimc) 11. The IMC filter 11 outputs a manipulation amount u, and the manipulation amount u and a disturbance d are input to a control object ($Pe^{-Ls}$) 2. In the control device, two closed loops are formed. A first closed loop is a closed loop that calculates a correction amount from a sensor value y of the control amount output from the control object 2 and feeds the correction amount back to the manipulation amount u for the next step. A second closed loop is a closed loop that calculates a correction amount from the manipulation amount u yet to be input to the control object 2 and feeds the correction amount back to the manipulation amount u for the next step.

The second closed loop includes a first arithmetic unit 21, a second arithmetic unit 22, and a third arithmetic unit 23 viewed in a signal transmission sequence. The manipulation amount u is input to the first arithmetic unit 21, and the correction amount for the manipulation amount u for the next step is output from the third arithmetic unit 23. The first arithmetic unit 21 comprises a delay element (D) 17 and a controller ($Me^{-(L-3T)s}$) 12. The second arithmetic unit 22 comprises a delay element (D) 18 and a controller (Cdis) 13. The third arithmetic unit 23 comprises a delay element (D) 19 and a controller (Cimc) 14.

The delay elements (D) 17, 18 and 19 are elements that delay an input signal by one step and output the delayed signal. $e^{-Ts}$ in the formula (3) is replaced with the delay element (D) as a result of discretization in the process of implementation. With such a configuration, the manipulation amount u for the preceding step is input to the controller 12, an output of the controller 12 for the preceding step is input to the controller 13, an output of the controller 13 for the preceding step is input to the controller 14. The controller 12 corresponds to the prediction model ($Me^{-Ls}$) from which the delay elements ($e^{-Ts}$) for three control periods have been separated. The dead time element ($e^{-(L-3T)s}$) included in the controller 12 is an element that has been converted into a rational function by Pade approximation. The controller 13 corresponds to the disturbance compensator, and the controller 14 corresponds to the IMC filter.

The first closed loop includes a fourth arithmetic unit 24. The fourth arithmetic unit 24 comprises a controller (Cdis) 15 and a controller (Cimc) 16. The controller 15 corresponds to the disturbance compensator, and the controller 16 corresponds to the IMC filter. The sensor value y is input to the controller 15, and the controller 16 outputs a correction amount for the manipulation amount u for the next step. In the fourth arithmetic unit 24, the controllers 15 and 16 sequentially perform operations.

The control device according to this embodiment is implemented in a multi-core computing device. In the implementation, the IMC filter 11, the first arithmetic unit 21, the second arithmetic unit 22, the third arithmetic unit 23, and the fourth arithmetic unit 24 are embodied as separate cores. That is, the operation by the IMC filter to convert the target value r into the manipulation amount u, the operation of the transfer function of the second closed loop to feed back the manipulation amount u and the operation of the transfer function of the first closed loop to feed back the sensor value y are separated as different tasks, and the operation of the transfer function of the second closed loop is divided into separate tasks of the operations relating to the three controllers, and the resulting tasks are allocated to five cores in total.

Figure 2:
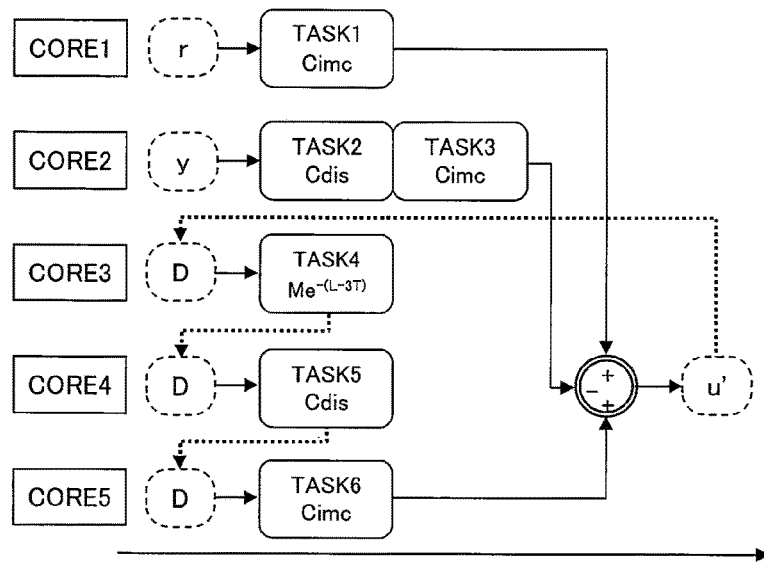
FIG. 2 is a diagram showing a temporal relationship between operations of controllers in a case where the control logic shown in FIG. 1 is implemented in a multi-core computing device.

FIG. 2 is a diagram showing a temporal relationship between operations of the controllers in a case where the control logic shown in FIG. 1 is implemented in a multi-core computing device. In FIG. 2, the horizontal axis is the time axis, and the processings in one step are arranged on the time axis. In this drawing, a task 1 relating to the operation by the IMC filter 11 is allocated to a core 1, and the target value r is input for the task 1. A task 2 relating to the operation by the controller 15 and a task 3 relating to the operation by the controller 16 are allocated to a core 2, and the sensor value y is input for the tasks 2 and 3. In the core 2, the tasks 2 and 3 are sequentially processed.

Tasks relating to the operations by the transfer functions of the second closed loop are allocated to cores 3, 4 and 5 in a distributed manner. A task 4 relating to the operation by the controller 12 is allocated to the core 3. For the task 4, the manipulation amount u delayed by one step by the delay element 17, that is, the previous value of the manipulation amount u, is input. A task 5 relating to the operation by the controller 13 is allocated to the core 4. For the task 5, an output of the task 4 delayed by one step by the delay element 18 is input. A task 6 relating to the operation by the controller 14 is allocated to the core 5. For the task 6, an output of the task 5 delayed by one step by the delay element 19 is input. Additions and subtractions for calculating the manipulation amount u' for the next step from the outputs of the tasks 1, 3 and 6 are allocated to any one of the cores, preferably, the core that performs the smallest amount of operation. In the example shown in FIG. 2, the core 4 performs the additions and subtractions for calculating the manipulation amount u'.

At the start of the step, the target value r is read via an input port for the task 1, and the sensor value y is read via the input port for the task 2. In addition, at the start of the step, the previous values of the outputs of the delay elements are read for the tasks 4, 5 and 6. In the first step, however, a value set as an initial value at a time 0 is read from the delay elements for the tasks 4, 5 and 6. In any case, with the operations by the cores 3, 4 and 5, as with the operations by the cores 1 and 2, any task can be started without waiting for another core to complete its task(s). Therefore, as with the cores 1 and 2, the cores 3, 4 and 5 can start operations in parallel without waiting for another core to complete its operation.

As described above, with the control device according to this embodiment, operations involved with the internal model control, more specifically, operations by the second closed loop that feeds back the manipulation amount u are distributed among the cores 3, 4 and 5, and the cores 3, 4 and 5 perform the operations in parallel. The tasks are distributed in such a manner that substantially equal amounts of operation are allocated to the cores, so that the operating time of a core is prevented from being markedly longer than the operating times of the other cores. Therefore, with the control device according to this embodiment, the operating time required for processing of one step can be reduced compared with the operating time of the conventional device, and the operating speed of the whole of the device can be further improved.

The control object of the control device according to this embodiment may be an internal combustion engine of an automobile. The internal combustion engine may be a spark ignition engine or a diesel engine. For example, if the control object is the spark ignition engine, the control amount may be torque, and the manipulation amount may be throttle. Alternatively, if the control object is the spark ignition engine, the control amount may be torque, and the manipulation amount may be fuel injection amount. If the control object is a supercharged engine, the control amount may be supercharging pressure, and the manipulation amount may be waist gate valve opening or variable nozzle opening. Furthermore, if the control object is an engine provided with an EGR device, the control amount may be EGR rate, and the manipulation amount may be EGR opening.

When the control object is an internal combustion engine, the control period T of the control device can be changed in synchronization with the combustion cycle of the internal combustion engine. Of course, the control period T of the control device may be a fixed value. For example, the control period T may be set with respect to the combustion cycle at the time of maximum permissible rotation of the internal combustion engine.

Furthermore, the control object controlled by the control device according to this embodiment is not limited to the internal combustion engine. For example, the control device according to this embodiment can be applied to a hybrid system of an internal combustion engine and an electric motor or a fuel cell system. The control device according to this embodiment is suitable for a control object that requires real-time online control. In particular, the control device according to this embodiment is suitable for controlling a power unit of a mobile body and particularly suitable as a control device mounted on a mobile body. Of course, the control device according to this embodiment can be applied not only to the power unit of a mobile body but also to a wide variety of control objects including stationary installations, as far as the control object has a dead time.

The present invention is not limited to the embodiment described above, and various modifications can be made without departing form the spirit of the present invention. For example, if the dead time L of the control object 2 is longer than four times the control period T, the first arithmetic unit 21 may be further divided into two arithmetic units. In that case, the controller ($Me^{-(L-3T)s}$) 12 is divided into a prediction model (M) that ignores the dead time, a delay element ($e^{-Ts}$) and a dead time element ($Me^{-(L-4T)s}$) having the remaining dead time. The prediction model (M) that ignores the dead time and the delay element ($e^{-Ts}$) form one arithmetic unit, and the dead time element ($Me^{-(L-4T)s}$) having the remaining dead time and the delay element 17 form the other arithmetic unit. Different cores are used as these arithmetic units. If the dead time L of the control object 2 is three times as long as the control period T, the dead time element can be omitted.

Although the number of steps by which each of the delay elements 17, 18 and 19 delays the input is preferably one as described in the above embodiment, the delay elements 17, 18 and 19 may delay the respective inputs by a plurality of steps by adjusting the dead time of the controller 12. That is, it is necessary only that the sum of the total delay time of the delay elements 17, 18 and 19 and the dead time of the controller 12 is equal to the dead time of the control object 2.

Figure 3:
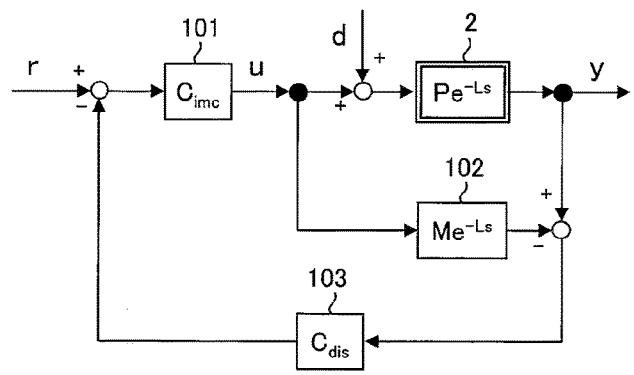
FIG. 3 is a block diagram showing a control logic of a typical internal model control used for a conventional control device.
Figure 4:
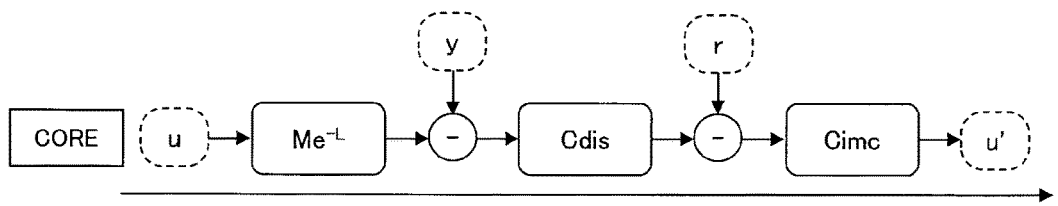
FIG. 4 is a diagram showing a temporal relationship between operations of controllers in a case where the control logic shown in FIG. 3 is implemented in a single-core computing device.
Figure 5:
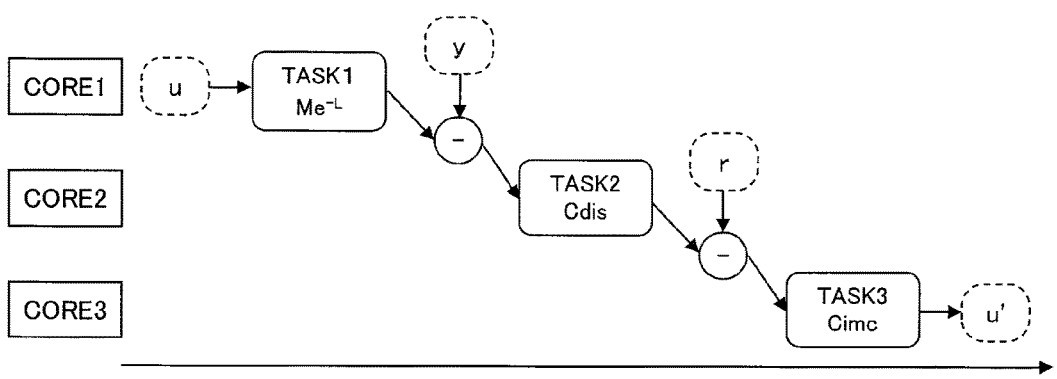
FIG. 5 is a diagram showing a temporal relationship between operations of controllers in a case where the control logic shown in FIG. 3 is implemented in a multi-core computing device.

Although it has been supposed in the embodiment described above that the transfer functions are linear transfer functions, even if the transfer functions are non-linear transfer functions, the structure shown in FIG. 3 can be transformed into the structure shown in FIG. 1 by appropriately changing the initial values and changing the sequence thereof. That is, the control device according to the present invention is not limited to the linear system but can be equally applied to the non-linear system.

REFERENCE SIGNS LIST 2 control object
11 IMC filter
12, 13, 14, 15, 16 controller
17, 18, 19 delay element
21, 22, 23, 24 arithmetic unit

The invention claimed is:
1. A control device that determines a manipulation amount of a control object having a dead time by feedback control so as to bring a control amount of the control object closer to a target value, comprising:
 a plurality of arithmetic units that operate in parallel,
 wherein the plurality of arithmetic units are configured so that a signal is sequentially transmitted by the arithmetic units, the manipulation amount is input to the first arithmetic unit in a signal transmission sequence, and a correction amount for the manipulation amount is output from the last arithmetic unit in the signal transmission sequence,
 each of the plurality of arithmetic units has a delay element that delays an input by a predetermined number of steps and a controller that produces an output by processing the input delayed by the delay element, and
 the plurality of arithmetic units are configured so that a sum of a total delay time determined by the number of the delay elements and a control period of the control device and a total dead time of the controllers is equal to the dead time of the control object.

2. The control device according to claim 1, wherein the control device is implemented in a multi-core processor that has a plurality of cores, and a different core is used as each of the plurality of arithmetic units.

3. The control device according to claim 1, wherein the plurality of arithmetic units are configured so that the amount of operation of the controller is uniform between the arithmetic units.

4. The control device according to claim 1, wherein any one of the controllers of the plurality of arithmetic units includes a prediction model of the control object that ignores the dead time.

5. The control device according to claim 1, wherein any one of the controllers of the plurality of arithmetic units includes a dead time element that uses, as a dead time, the difference between the dead time of the control object and the total delay time.

6. The control device according to claim 1, wherein any one of the controllers of the plurality of arithmetic units includes an IMC filter.

7. The control device according to claim 1, wherein any one of the controllers of the plurality of arithmetic units includes a disturbance compensator.

8. The control device according to claim 1, wherein the control object is an internal combustion engine, and the control period is set with respect to a combustion cycle of the internal combustion engine at the time of maximum permissible rotation.

9. The control device according to claim 1, wherein the control object is an internal combustion engine, and the control period is changed in synchronization with a combustion cycle of the internal combustion engine.

* * * * *